United States Patent [19]
Grane

[11] 3,907,902

[45] Sept. 23, 1975

[54] METHOD FOR THE PRODUCTION OF TERTIARY-BUTYL HYDROPEROXIDE

[75] Inventor: Henry R. Grane, Springfield, Pa.

[73] Assignee: Atlantic Richfield Company, Los Angeles, Calif.

[22] Filed: Apr. 2, 1969

[21] Appl. No.: 812,915

Related U.S. Application Data

[63] Continuation-in-part of Ser. No. 585,242, Oct. 10, 1966.

[52] U.S. Cl. .............................................. 260/610 B
[51] Int. Cl.² ...................................... C07C 179/02
[58] Field of Search ............ 260/610 B, 610 A, 632, 260/632 C

[56] References Cited
UNITED STATES PATENTS

| | | | |
|---|---|---|---|
| 2,733,270 | 1/1956 | Fisher | 260/610 B |
| 2,845,461 | 7/1958 | Winkler et al. | 260/610 B |

FOREIGN PATENTS OR APPLICATIONS

| | | | |
|---|---|---|---|
| 1,472,174 | 1/1965 | France | 260/610 B |
| 872,104 | 1/1965 | United Kingdom | 260/610 B |

*Primary Examiner*—Bernard Helfin
*Assistant Examiner*—W. B. Lone
*Attorney, Agent, or Firm*—John C. Martin, Jr.

[57] ABSTRACT

Method for increasing the selectivity of liquid phase isobutane oxidation for the production of tertiary-butyl hydroperoxide by introducing small amounts of either isopropyl alcohol, secondary butyl alcohol or isobutyl alcohol into the reaction zone.

5 Claims, No Drawings

METHOD FOR THE PRODUCTION OF TERTIARY-BUTYL HYDROPEROXIDE

RELATED APPLICATION

This application is a continuation-in-part of application Ser. No. 585,242 filed Oct. 10, 1966, entitled "Method for the Production of Tertiary-Butyl Hydroperoxide."

BACKGROUND OF THE INVENTION

1. Field of the Invention

This invention relates to a method for increasing the selectivity of the liquid phase oxidation of isobutane with molecular oxygen for the production of tertiary-butyl hydroperoxide by introducing small amounts of either isopropyl alcohol, secondary butyl alcohol or isobutyl alcohol into the reaction zone.

2. Prior Art

It has been found rather recently that tertiary-butyl hydroperoxide in combination with a molybdenum-, vanadium-, or tungsten-containing catalyst is useful for converting olefins to their corresponding epoxides. Since epoxides are valuable monomers for many polymeric materials, a method for producing tertiary-butyl hydroperoxide in large amounts at low cost is highly desirable.

U.S. Pat. No. 2,845,461 (1958) to Winkler et al discloses that isobutane can be oxidized in the liquid phase with molecular oxygen to produce a mixture of tertiary-butyl hydroperoxide and tertiary-butyl alcohol. According to the patent the reaction is carried out in the range of about 100°C. to 150°C. at a pressure in excess of 400 psig. An important feature is the absence of catalyst, particularly the absence of metal ions, since these tend to shift the reaction in the direction of increased tertiary-butyl alcohol production. It is pointed out in the patent that an advantage of the process is the ability to obtain a specifically desired ratio of tertiary-butyl hydroperoxide to tertiary-butyl alcohol. This control is obtained by varying operating variables such as conversion or contact time or both. It is pointed out that the ratio of tertiary-butyl hydroperoxide to tertiary-butyl alcohol decreases with increases in overall conversion.

The present invention differs from this process of the prior art by providing a method for increasing the amount of tertiary-butyl hydroperoxide in the products or, expressed in other words, increasing the ratio of tertiary-butyl hydroperoxide to tertiary-butyl alcohol at a given isobutane conversion level.

SUMMARY OF THE INVENTION

In accordance with this invention there is added with the isobutane being charged to the oxidation reactor at least 0.2 weight per cent based on the weight of the isobutane of an alcohol selected from the group consisting of isopropyl alcohol (2-propanol), isobutyl alcohol (2-methyl-1-propanol) and sec-butyl alcohol (2-butanol). Generally, not more than about 3.0 weight per cent is used. The addition of the alcohol changes the selectivity of the reaction toward increased production of tertiary-butyl hydroperoxide at any particular isobutane conversion level.

It is an object of this invention therefore to provide a method for increasing at a given isobutane conversion level the amount of tertiary-butyl hydroperoxide in the products from the liquid phase oxidation of isobutane using molecular oxygen.

Other objects of this invention will be apparent from the following description of the preferred embodiments and from the claims.

DESCRIPTION OF THE PREFERRED EMBODIMENTS

The alcohols which are added to the reaction along with the isobutane are isopropyl alcohol, isobutyl alcohol or sec-butyl alcohol. The addition of 1 per cent of one of these alcohols has been found to increase the weight per cent of tertiary-butyl hydroperoxide in the product over that which would be obtained in the absence of the added alcohol by 10 per cent or more. Other alcohols such as tertiary-butyl alcohol, which is one of the products of the reaction, when added with the isobutane in these small amounts, i.e., 3 per cent of less, gives substantially no improvement in the selectivity of the reaction toward the production of tertiary-butyl hydroperoxide. The action of these alcohols in the reaction is not completely understood; however, it is clear that very small amounts of them increase very markedly by several per cent the production of tertiary-butyl hydroperoxide, one of the main products at the expense of the tertiary-butyl alcohol, the other main component of the reaction product. The surprising discovery is that these specific alcohols have such a marked effect whereas other alcohols such as tertiary-butyl alcohol have substantially no effect at these same quantities.

The amount of the alcohols added range from about 0.2 weight per cent to 3.0 weight per cent based on the weight of the isobutane. The amount preferably ranges from 0.5 weight per cent to 2.0 weight per cent of the isobutane. The isobutane in the presence of the added alcohol is oxidized at a temperature in the range of from 200°F. to 300°F., and preferably in the range of from 265°F. to 295°F. Pressures in excess of about 300 psig, preferably in the range of from 400 to 700 psig, are used. The reaction is preferably carried out at a conversion rate in excess of 3 per cent of isobutane per hour at a conversion level of about 35 to 50 per cent.

In order to illustrate the effectiveness of the alcohol addition for increasing the ratio of tertiary-butyl hydroperoxide in the product stream a number of runs were carried out in stainless steel reactors. These results are set forth in the following examples. In these runs the isobutane was charged at a constant rate together with a slight excess of oxygen. The temperature and pressures of the reaction were varied and the conversion and weight per cent tertiary-butyl hydroperoxide in the product was determined.

EXAMPLE I

In Table I there is set forth typical examples from a very large number of runs made in the absence of added alcohol.

TABLE I

| Run No. | Temp. (°F.) | Press. (psig) | Conversion (%) | Wt.% TBHP* in product |
| --- | --- | --- | --- | --- |
| 1 | 275 | 500 | 35 | 58 |
| 2 | 275 | 380 | 40 | 57 |
| 3 | 290 | 400 | 50 | 46 |
| 4 | 290 | 540 | 48 | 49 |
| 5 | 290 | 600 | 44 | 51 |

TABLE I-Continued

| Run No. | Temp. (°F.) | Press. (psig) | Conversion (%) | Wt.% TBHP* in product |
|---|---|---|---|---|
| 6 | 290 | 600 | 44 | 47 |
| 7 | 290 | 600 | 41 | 52 |
| 8 | 290 | 420 | 37 | 50 |

*tertiary-butyl hydroperoxide

From these runs and others of a similar nature the following correlation table was constructed.

TABLE II

| Conversion | Weight % TBHP* in Product at Temp. of | | |
|---|---|---|---|
| | 257°F. | 275°F. | 290°F. |
| 30% | 68 | 62 | 56 |
| 35% | 66 | 60 | 54 |
| 40% | 64 | 58 | 51 |
| 45% | 63 | 56 | 49 |
| 50% | 62 | 54 | 46 |

*tertiary-butyl hydroperoxide

It will be seen from Table II that selectivity for production of tertiary-butyl hydroperoxide decreases with an increase in isobutane conversion level or an increase in reaction temperature or with an increase in both.

The following table compares the actual amount of tertiary-butyl hydroperoxide found in the product for each of the runs set forth above in Table I with the amount predicted from Table II.

TABLE III

| Run No. | Wt. % TBHP* in product | Predicted Wt. % TBHP* in Product |
|---|---|---|
| 1 | 58 | 60 |
| 2 | 57 | 58 |
| 3 | 46 | 46 |
| 4 | 49 | 47 |
| 5 | 51 | 49 |
| 6 | 47 | 49 |
| 7 | 52 | 51 |
| 8 | 50 | 53 |

*tertiary-butyl hydroperoxide

It will be seen that deviations range from 0 to 3 per cent between the actual and predicted values with a mean deviation of only a few tenths of a per cent, thus demonstrating that Table II is an excellent correlation.

EXAMPLE II

In order to demonstrate the utility of the instant invention two runs are shown in Table IV wherein there was continuous injection of about 1 weight per cent of isobutyl alcohol in the first run and about 1 weight per cent isopropyl alcohol in the second run. It will be seen that the difference obtained in the weight per cent tertiary butyl hydroperoxide in the product is in both cases far higher than could be attributed to any mere deviation between actual and correlated values.

TABLE IV

| Run No. | Temp. (°F.) | Press. (psig) | Conversion (%) | Wt. % TBHP* in product | Predicted Wt. % TBHP* in Product |
|---|---|---|---|---|---|
| 1 | 290 | 500 | 39 | 61 | 51 |
| 2 | 290 | 650 | 31 | 69 | 56 |

*tertiary-butyl hydroperoxide

I claim:

1. In a process for the liquid phase oxidation of isobutane wherein said isobutane is charged in the liquid phase to an oxidation reactor and contacted therein with molecular oxygen at a temperature in the range of from 200° F. to 300° F. and a pressure in the range of from 300 psig. to 700 psig. to produce a mixture of tertiary-butyl alcohol and tertiary-butyl hydroperoxide, the improvement which consists essentially of improving the selectivity of the reaction for the production of tertiary-butyl hydroperoxide for any isobutane conversion level by adding with said isobutane charged to said reactor from 0.2 weight per cent to 3.0 weight per cent based on the weight of isobutane of an alcohol selected from the group consisting of isopropyl alcohol, isobutyl alcohol and secondary butyl alcohol.

2. The process according to claim 1 wherein the amount of alcohol added is in the range of 0.5 weight per cent to 2.0 weight per cent based on the weight of the isobutane.

3. The process according to claim 1 wherein the alcohol added isopropyl alcohol.

4. The process according to claim 1 wherein the alcohol added is isobutyl alcohol.

5. The process according to claim 1 wherein the alcohol added is sec-butyl alcohol.

* * * * *